United States Patent
Kushita

[11] Patent Number: 6,118,436
[45] Date of Patent: Sep. 12, 2000

[54] PORTABLE TERMINAL APPARATUS HAVING HANDWRITTEN DATA INPUT MEANS

[75] Inventor: Masayuki Kushita, Tokyo, Japan

[73] Assignee: NEC Corporation, Tokyo, Japan

[21] Appl. No.: 09/129,406

[22] Filed: Aug. 5, 1998

[30] Foreign Application Priority Data

Aug. 6, 1997 [JP] Japan .................................. 9-211483

[51] Int. Cl.$^7$ ...................................................... H05K 7/10
[52] U.S. Cl. .................. 345/173; 345/1; 341/20; 341/21; 341/22
[58] Field of Search ................... 345/173, 1; 341/20, 341/21, 22

[56] References Cited

FOREIGN PATENT DOCUMENTS

| 0 181 196 | 5/1986 | European Pat. Off. . |
| 2-89534 | 7/1990 | Japan . |
| 2-226323 | 9/1990 | Japan . |
| 4-299718 | 10/1992 | Japan . |
| 6-11024 | 2/1994 | Japan . |
| 8-221169 | 8/1996 | Japan . |
| 8-234909 | 9/1996 | Japan . |
| 2 190 269 | 11/1987 | United Kingdom . |

*Primary Examiner*—Bipin Shalwala
*Assistant Examiner*—Vincent E. Kovalick
*Attorney, Agent, or Firm*—McGinn & Gibb, P.C.

[57] ABSTRACT

A portable terminal apparatus including a main body with display unit capable of displaying a character or other patterns on an upper surface side thereof and a key display on a lower surface side thereof, and a lid which can be mounted on and detached from the main body and which has a transparent touch panel arranged at a position to cover either one of the display means and the key display when the lid is mounted on the main body. The main body has a recognizing section for recognizing the mounting condition of the lid whether the touch panel is mounted on the upper surface side or the lower surface side of said main body, a determining section for determining a position pointed on the touch panels a controlling section for controlling display of a character or a pattern displayed on the display unit, and a central processing unit for controlling the display control unit on the basis of outputs from the recognizing section and the determining section and for causing the display unit to display the character or other pattern.

7 Claims, 11 Drawing Sheets

FIG. 8A

| SIGNAL | LID ELECTRODE | MAIN BODY ELECTRODE | STATE IN X-COORDINATE DETECTION | STATE IN Y-COORDINATE DETECTION |
|---|---|---|---|---|
| S11 | T5 | T1 | X-COORDINATE VOLTAGE OUTPUT | 3-V INPUT |
| S12 | T6 | T2 | 3-V INPUT | Y-COORDINATE VOLTAGE OUTPUT |
| S13 | T7 | T3 | (X-COORDINATE VOLTAGE OUTPUT) | GND LEVEL |
| S14 | T8 | T4 | GND LEVEL | (Y-COORDINATE VOLTAGE OUTPUT) |

FIG. 8B

| SIGNAL | LID ELECTRODE | MAIN BODY ELECTRODE | STATE IN X-COORDINATE DETECTION | STATE IN Y-COORDINATE DETECTION |
|---|---|---|---|---|
| S14 | T8 | T1 | 3-V INPUT | Y-COORDINATE VOLTAGE OUTPUT |
| S13 | T7 | T2 | X-COORDINATE VOLTAGE OUTPUT | 3-V INPUT |
| S12 | T6 | T3 | GND LEVEL | (Y-COORDINATE VOLTAGE OUTPUT) |
| S11 | T5 | T4 | (X-COORDINATE VOLTAGE OUTPUT) | GND LEVEL |

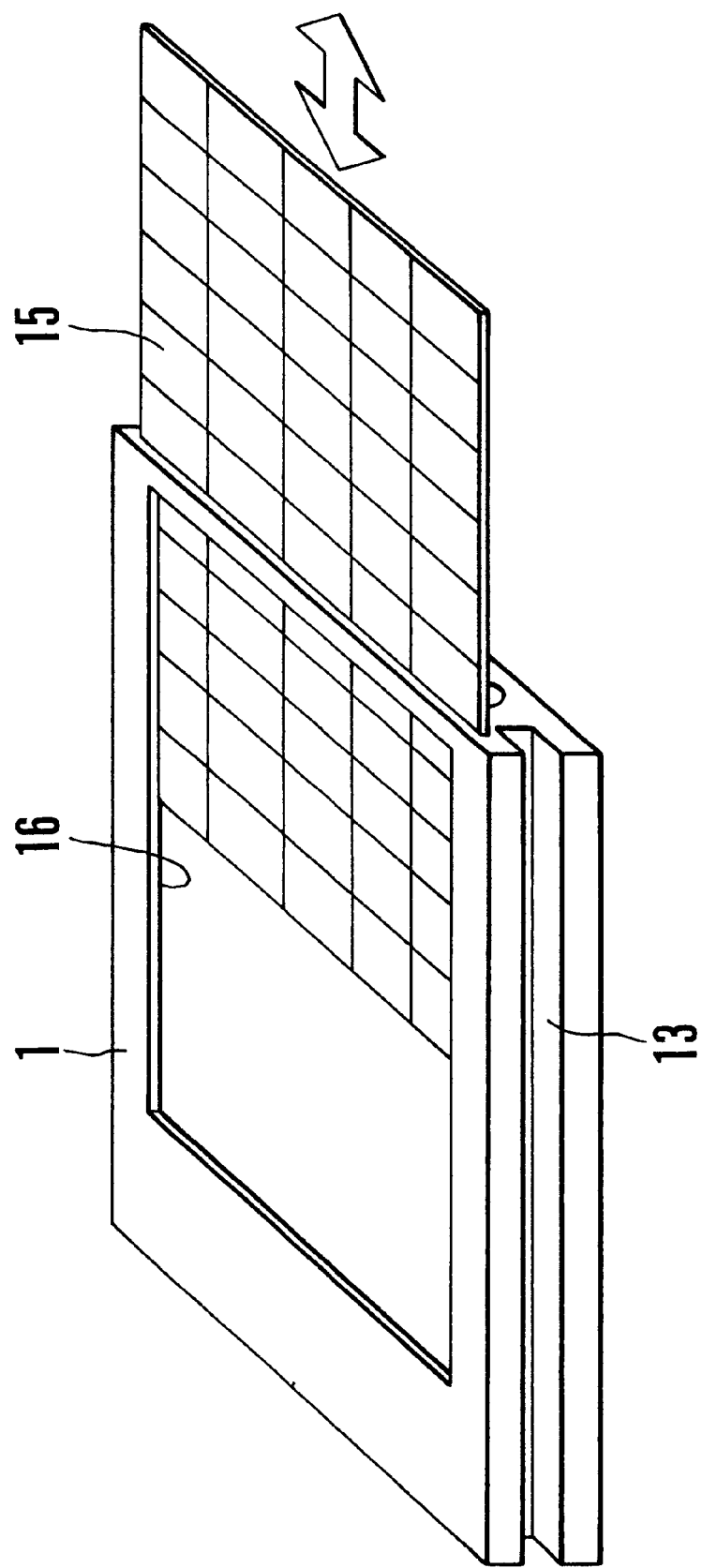

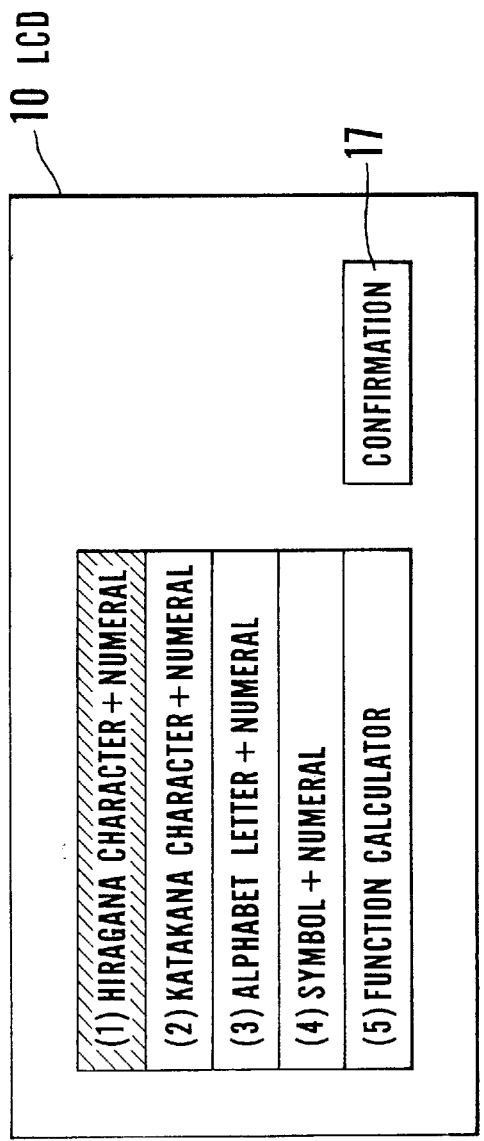
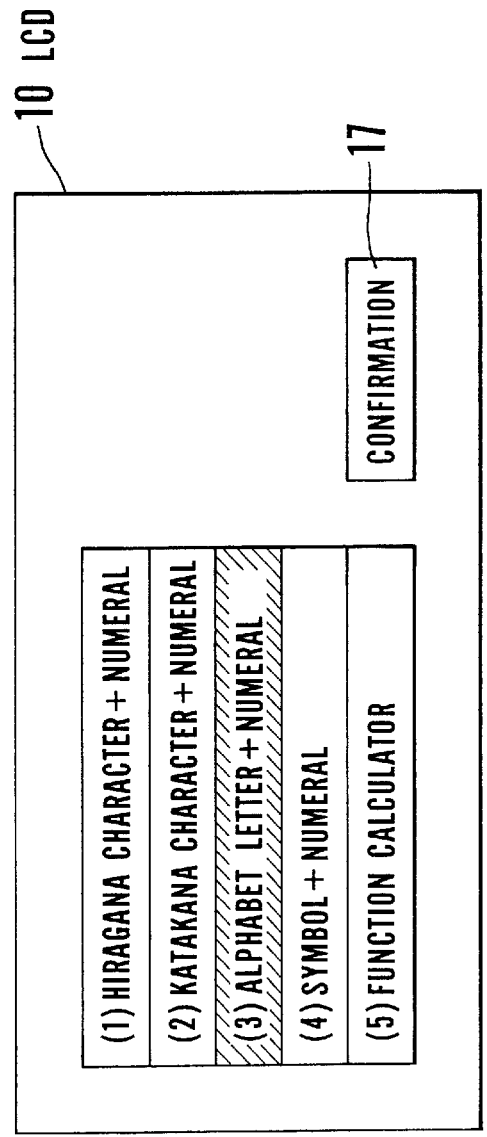

PORTABLE TERMINAL APPARATUS HAVING HANDWRITTEN DATA INPUT MEANS

BACKGROUND OF THE INVENTION

1. Field of the Invention

The present invention relates to a portable terminal apparatus capable of performing data input and having a liquid crystal display (LCD) for displaying characters and the like and, more particularly, to a portable terminal apparatus having a pressure-sensitive tablet (to be referred to as a touch panel hereinafter) as a handwritten data input means.

2. Description of the Prior Art

In a conventional portable terminal apparatus which has a display constituted by an LCD to display characters and the like and which is capable of performing handwritten data input, a transparent touch panel is adhered and fixed to the LCD. When handwritten data is input on the touch panel, it is input to the terminal apparatus. In a terminal apparatus of this type, a software keyboard is displayed on the LCD region where the touch panel is arranged. The user points a portion of the touch panel corresponding to a key displayed on the keyboard, thereby inputting target sentences. Since the LCD also need to display the contents of the input sentences, the entire surface of the LCD must be partitioned into the keyboard region and the display region, inevitably reducing the respective areas. As a result, when a large number of keys are displayed on the keyboard region, the individual key size becomes small. Then, the pointing operation described above becomes difficult to perform, and an erroneous operation such as operating an adjacent key tends to occur easily. When the area of the keyboard region is increased, the area of the display region is decreased. Then, the sentences that can be displayed become short, making it difficult to recognize and edit the sentences.

In this manner, the technique described in the official gazettes is effective in that it enables accurate key input even when the software keyboard is displayed small. However, to display a software keyboard in a small size is limited, the conventional technique cannot drastically solve the problems described above, and the problem of the limited display region area still remains.

In addition to the problem of the display area, since the touch panel is adhered to the surface of the LCD, when the touch panel is damaged, the touch panel must be replaced together with the LCD. This makes the repair cumbersome and increases the repair cost imposed on the user. Since the LCD display contents are observed through the touch panel, the readability of the display is worse than in a terminal apparatus having no touch panel. Usually, a touch panel has a light transmittance of about 80%. In particular, the readability of an LCD having no backlight is considerably degraded.

In order to solve these problems, in Japanese Unexamined Patent Publication No. 8-221169, a software keyboard display method is proposed in which after a key which is pointed first is recognized by the terminal apparatus, a key which will be pointed next is estimated, and the estimated key is displayed larger than other keys. Even when a large number of keys are displayed, a key which is highly likely to be pointed next is displayed larger than other keys. This is effective in preventing an erroneous operation as described above caused by the small key size. Japanese Unexamined Patent Publication No. 8-234909 proposes a technique with which, upon pointing a key, if an adjacent key is also erroneously pointed simultaneously because of the small key size, only the corresponding region is displayed large and re-pointing is allowed to enable accurate key input.

SUMMARY OF THE INVENTION

The present invention has been made in consideration of the above situation in the prior art, and has as its object to provide a portable terminal apparatus having a handwritten data input means, which allows easy key input, can increase the area of a display region on an LCD, increases the readability of the LCD, and can decrease the repair cost for a fracture.

In order to achieve the above object, according to the major aspect of the present invention, there is provided a portable terminal apparatus having handwritten data input means, comprising a main body with display means capable of displaying a character or other patterns on an upper surface side thereof and a key display on a lower surface side thereof, and a lid which can be mounted on and detached from the main body and which has a transparent touch panel arranged at a position to cover either one of the display means and the key display when the lid is mounted on the main body. The main body has means for recognizing on which one of the upper and lower surface sides of the main body the touch panel is mounted, means for determining a position pointed on the touch panel, means for controlling display of a character or a pattern displayed on the display means, and central processing means for controlling the display control means on the basis of outputs from the mounting recognition means and the position determination means and causing the display means to display the character or other pattern.

The present invention has the following supplementary aspect. When the lid is mounted on the upper surface side of the main body and the display control means displays a software keyboard on a partial region of the display means, the central processing means performs a control operation for displaying input data, corresponding to a key located at a position which is pointed on the touch panel, on another region of the display means. When the lid is mounted on the upper surface side of the main body and the display control means does not display a software keyboard on the display means, the central processing means continuously determines positions pointed on the touch panel and displays the determined positions as handwritten input data on the display means. When the lid is mounted on the lower surface side of the main body, the central processing means performs a control operation for displaying input data, corresponding to the key display at a position which is pointed on the touch panel, on the display means.

In addition to the major aspect described above, the present invention preferably has the following supplementary aspect. The key display can be mounted by exchanging a plurality of key cards having different key arrangements, and the central processing means has a function of recognizing a mounted key card and displaying input data on the basis of the recognized key card. The main body has auxiliary display means, beside the key display, on a lower surface thereof, and a control operation is performed such that latest input data, corresponding to the key display at a position pointed on the touch panel, is displayed on the auxiliary display means. The display means on the upper surface side of the main body is supported by the main body through a hinge mechanism so as to be directed toward a front surface side of the main body.

As is apparent from the above aspects, according to the present invention, the portable terminal apparatus comprises the main body having the display means and key display, and the lid which can be mounted on and detached from the upper and lower sides of the main body and which has a touch panel. Data input and input data display are controlled in accordance with how the lid is mounted on the main body. For example, when the lid is mounted on the upper surface side of the main body, data input using the software keyboard displayed on the partial region of the display means and input data display on another region of the display means are enabled, or data input of handwritten data input from the touch panel or input data display using the entire region of the display means is enabled. When the lid is mounted on the lower surface side of the main body, data input utilizing the key display on the lower surface side and input data display using the entire region of the display means on the upper surface side are enabled. When the touch panel is damaged, the lid can be removed from the main body and replaced for another one. The LCD as the display means of the main body need not be replaced, and the repair cost imposed on the user is decreased. Since the touch panel can be retreated from the surface of the display means, poor readability caused by the low light transmittance of the touch panel can be solved.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIGS. 8A and 8B are operation tables for explaining the input recognition operation of the touch panel;

FIG. 9 is a perspective view of a modification of the main body of the portable terminal apparatus according to the present invention which is seen from the lower surface side;

FIGS. 10A and 10B are views for explaining the operations of recognizing different types of key cards;

DETAILED DESCRIPTION OF THE PREFERRED EMBODIMENTS

Figure 1:
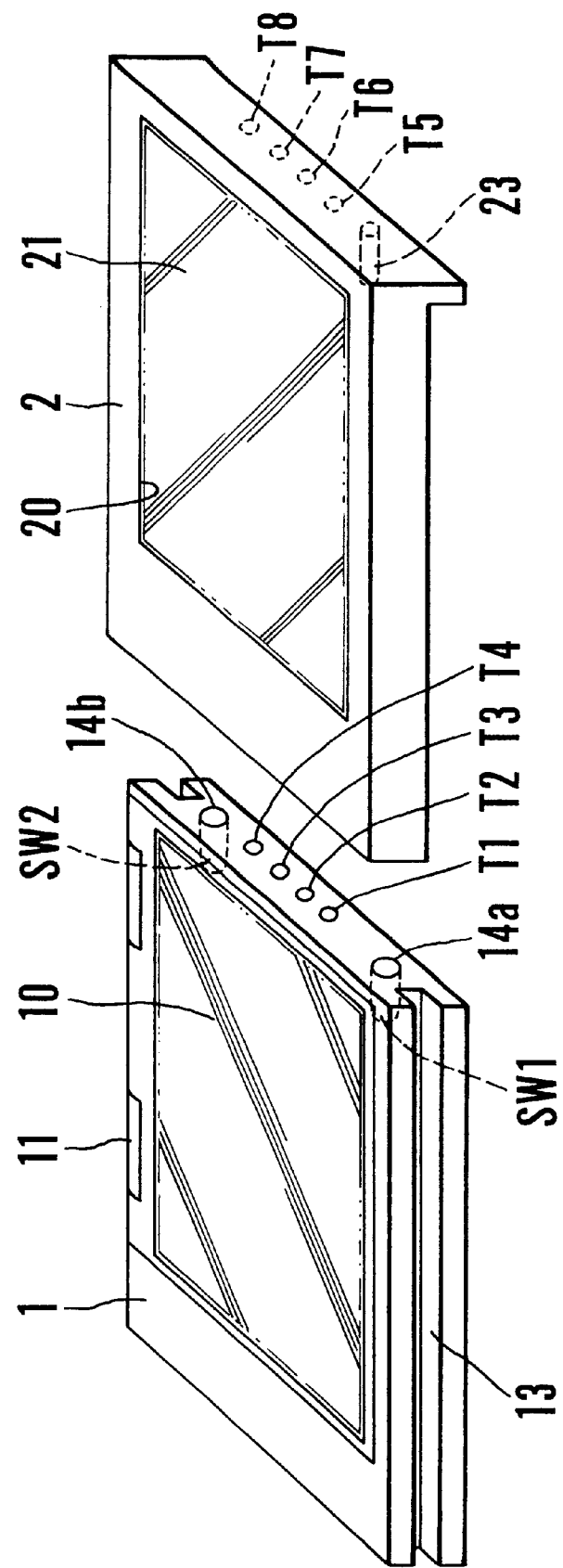
FIG. 1 is a partial exploded perspective view of a portable terminal apparatus according to the present invention which is seen from the front surface side.
Figure 2:
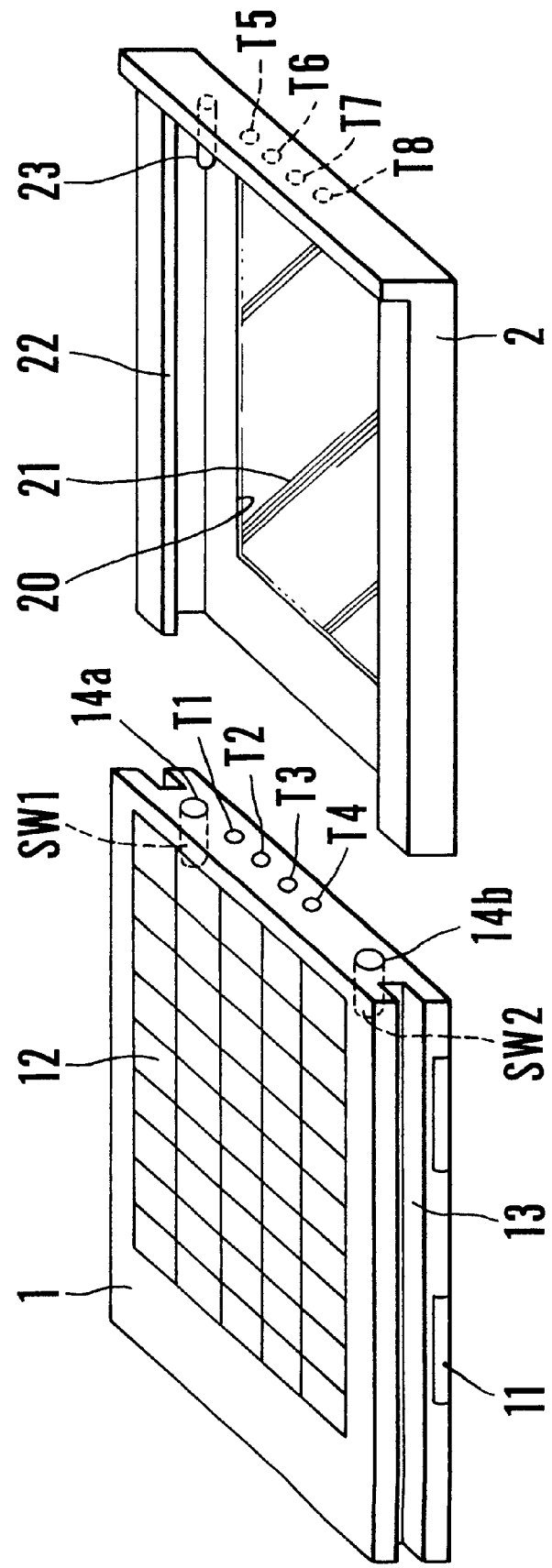
FIG. 2 is a partial exploded perspective view of the portable terminal apparatus of FIG. 1 which is seen from the lower surface side.

The present invention will be described in detail with reference to its several preferred embodiments and their modifications shown in the accompanying drawings.

One embodiment of the present invention will be described with reference to from FIG. 1 to FIGS. 8A and 8B. A portable terminal apparatus according to this embodiment is constituted by a main body 1 made of a flat rectangular housing, and a lid 2 which can be mounted on and detached from the main body 1 with slide mechanisms. An LCD 10 for displaying characters and the like is mounted on the upper surface of the main body 1. The LCD 10 can be swung with respect to the main body 1 in a direction of one of side surfaces perpendicular to the upper surface of the main body 1 through hinge mechanisms 11 disposed along the one of side surfaces of the main body 1. Print keys 12 to which labels printed with letters, numerals, and the like adhered are disposed on the lower surface of the main body 1 within an area substantially equal to that of the LCD 10. Slide grooves 13 that serve as guides when sliding the lid 2 are formed in both the side surfaces of the main body 1 in the longitudinal direction thereof. Two switches SW1 and SW2 and four electrodes T1 to T4 are arranged on one end face of the main body 1. The two switches SW1 and SW2 are respectively disposed in switch holes 14a and 14b so that either one of them is operated when the lid 2 is mounted on the main body 1. The four electrodes T1 to T4 serve to exchange electrical signals between the main body 1 and the lid 2.

Figure 3:
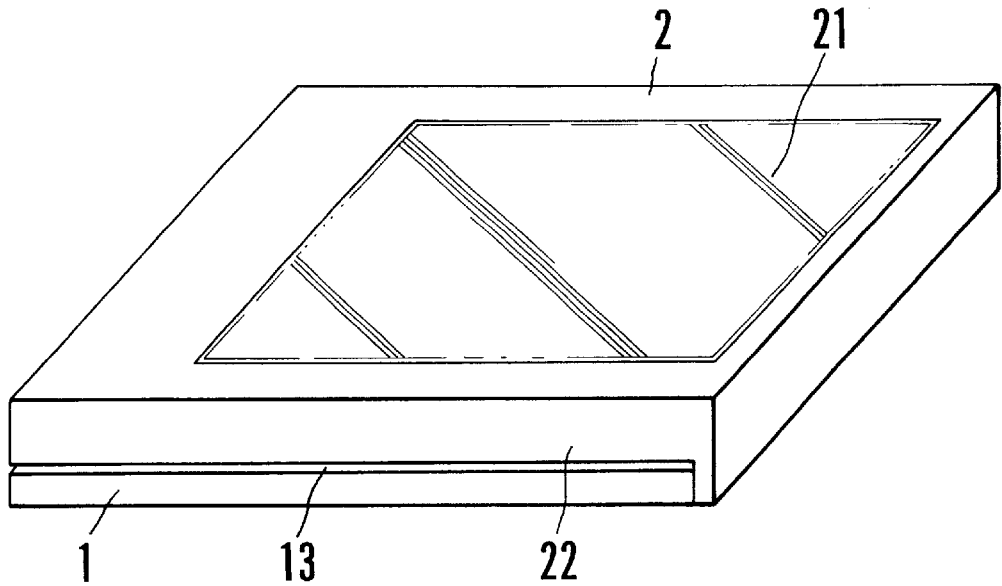
FIG. 3 is a perspective view of the portable terminal apparatus of FIG. 1 in an assembled state which is seen from the front surface side.
Figure 4A:
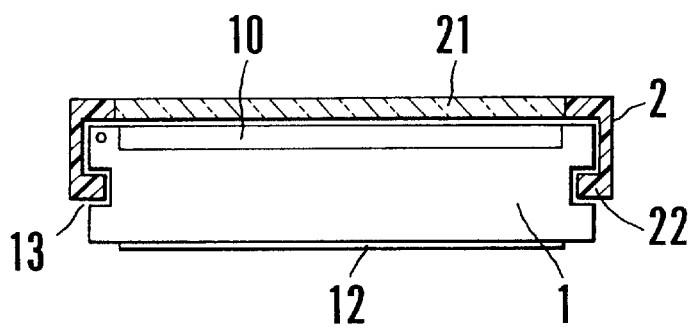
FIGS. 4A and 4B are schematic sectional views showing a state wherein the lid is mounted on the front surface side and the lower surface side, respectively.
Figure 4B:
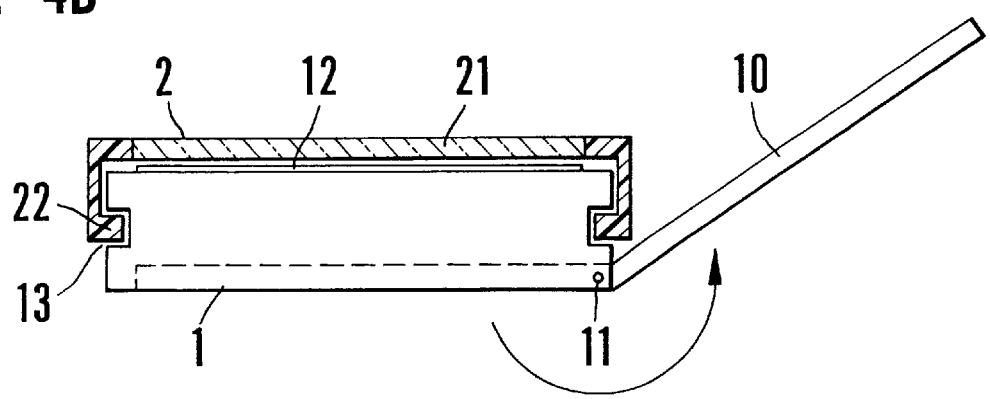

The lid 2 has an inner size corresponding to the outer shape of the main body 1, and is formed to have a U-shaped section. An opening 20 having the same size as that of the LCD 10 of the main body 1 or of the area of the print keys 12 is formed in the surface of the lid 2. A touch panel 21 is disposed inside the opening 20. Guide pieces 22 to fit in the slide grooves 13 of the main body 1 are integrally formed on both the side surfaces of the lid 2. When the guide pieces 22 are fitted in the slide grooves 13, the lid 2 is mounted to cover the outer periphery of the main body 1, as shown in FIG. 3. In this case, the lid 2 can be mounted in two manners, i.e., so as to cover the upper surface side of the main body 1 where the LCD 10 is disposed, as shown in FIG. 4A, or so as to cover the lower surface side of the main body 1 where the print keys 12 are disposed, as shown in FIG. 4B. One switch projection 23 and lid electrodes T5 to T8 are arranged at positions on one side of the end wall surface on one end of the lid 2. The switch projection 23 can be selectively fitted in the two switch holes 14a and 14b of the main body 1. The lid electrodes T5 to T8 can come into contact with the four electrodes T1 to T4. When the lid 2 is mounted on the main body 1, as described above, the switch projection 23 is fitted in one of the two switch holes 14a and 14b in accordance with on which one of the upper and lower surface sides of the main body 1 the lid 2 is mounted, to operate the switch SW1 or SW2 inserted there. Accordingly, on which one of the upper and lower surface sides of the main body 1 the lid 2 is mounted can be recognized by determining which switch is operated in the main body 1. Simultaneously, the four main body electrodes T1 to T4 and the four lid electrodes T5 to T8 are electrically connected to each other, so that electrical signals can be exchanged between the main body 1 and the lid 2.

In the portable terminal apparatus having the above arrangement, when the lid 2 is mounted on the upper surface side of the main body 1, as shown in FIG. 4A, the touch panel 21 of the lid 2 is arranged above the LCD 10 of the main body 1 to be nearly in tight contact with it. Accordingly, when the software keyboard is displayed on a partial region of the display surface of the LCD 10 and a touch panel portion above a key which is to be entered and which is observed through the touch panel 21 is touched with a finger or an input pen, an input operation with this key is enabled, and the input character or the like can be displayed on another region of the LCD 10. Therefore, in this case, an input operation similar to that of the conventional technique described above can be performed.

On the other hand, the software keyboard need not be displayed on the LCD 10 at all, but a character or a symbol to be input may be handwritten on the touch panel 21 as a handwritten input with the finger or input pen. Then, a coordinate signal corresponding to this writing operation is output on the touch panel 21, and the input character or symbol is recognized from the coordinate signal. The recognized character or the like can be displayed on the LCD 10. In this case, the entire surface of the display surface of the LCD 10 can be utilized as the display region, and many input data can be displayed, facilitating confirmation and editing of the sentences.

When the lid 2 is mounted on the lower surface side of the main body 1, as shown in FIG. 4B, the touch panel 21 of the lid 2 is arranged above the print keys 12 of the main body 1. When a touch panel portion which is above a print key 12 and which is observed through the touch panel 21 is pointed with the finger or the input pen, an input operation with this key is enabled. The input character or the like is displayed on the LCD 10 on the upper surface side of the main body 1. When the LCD 10 is swung through the hinge mechanisms 11 at an angle of 180°, as shown in FIG. 4B, the display surface of the LCD 10 can be disposed to an adjacent position of the touch panel 21, and the input character or the like can be recognized on the LCD 10. Accordingly, the entire region of the display surface of the LCD 10 can be utilized as the display region, while the print keys 12 can be formed within an area utilizing the entire surface of the touch panel 21, making it easy to touch each key.

Figure 5:
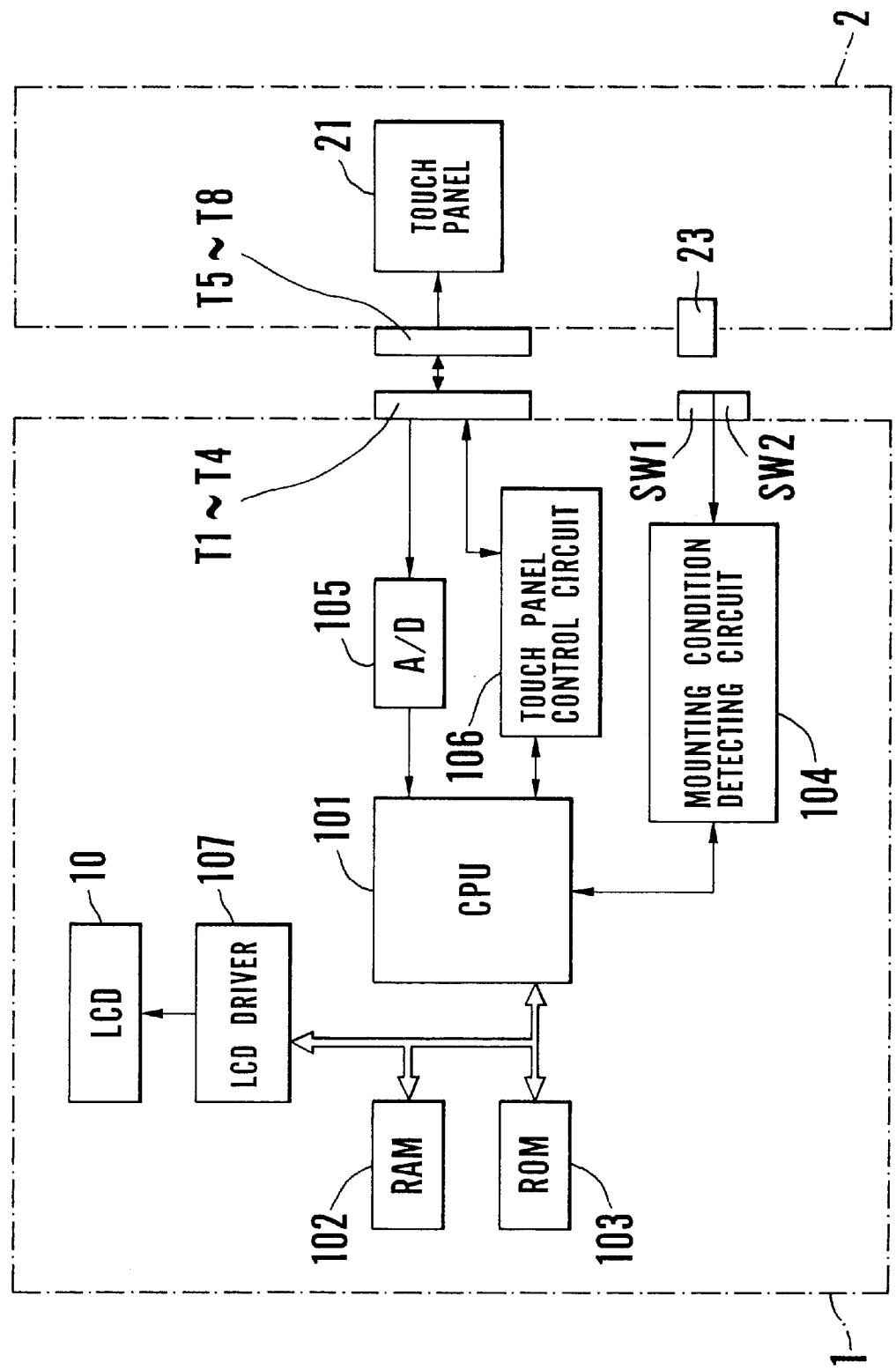
FIG. 5 is a block diagram showing the arrangements of the internal circuits of the main body and the lid.

The arrangement of the circuit portion incorporated in the main body 1 will be described with reference to the block circuit diagram of FIG. 5. A ROM 103 stores program data to be executed by a CPU 101, and font data, e.g., characters and symbols, to be displayed on the LCD 10. A RAM 102 has a work region for the CPU 101 and a save region for the user data, e.g., a file. As described above, when the lid 2 is mounted on the main body 1, the switch SW1 or SW2 is closed by engaging with the switch projection 23. A change in signal caused by the operation of the switch SW1 or SW2 is detected by a mounting condition detecting circuit 104. The mounting condition detecting circuit 104 saves the detection result and interrupts the CPU 101. Similarly, when the lid 2 is separated from the main body 1, the switch SW1 or SW2 is opened. A change in signal caused by the opening operation of the switch SW1 or SW2 is detected by the mounting condition detecting circuit 104. The mounting condition detecting circuit 104 saves the detection result and interrupts the CPU 101. Upon being interrupted by the mounting condition detecting circuit 104, the CPU 101 accesses the mounting condition detecting circuit 104 to obtain information that the lid 2 is mounted or separated.

Figure 6A:
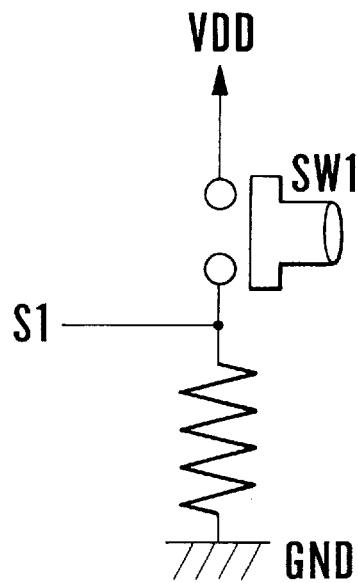
FIGS. 6A and 6B are circuit diagrams of switches respectively used in the portable terminal apparatus according to the present invention.
Figure 6B:
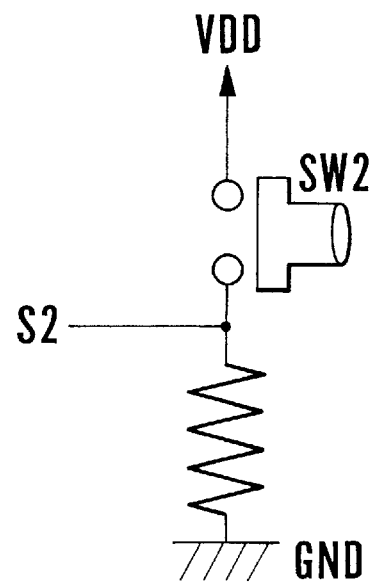

The switches SW1 and SW2 respectively have arrangements as shown in FIGS. 6A and 6B. The switch SW1 is turned on when the lid 2 is mounted on the upper surface side of the main body 1. The switch SW2 is turned on when the lid 2 is mounted on the lower surface side of the main body 1. Both the switches SW1 and SW2 are connected to GND through resistors to form so-called pull-down connection. Therefore, when the lid 2 is not mounted on the main body 1 and both the switches SW1 and SW2 are open, both signals S1 and S2 are at the GND level (0 V). In this state, when the lid 2 is mounted on the upper surface side of the main body 1, the switch SW1 is turned on, and the signal S1 rises from the GND level to the VDD level (e.g., 3 V). When the lid 2 is mounted on the lower surface side of the main body 1, the switch SW2 is turned on, and the signal S2 changes from the GND level to the VDD level. Therefore, when the mounting detection circuit 104 detects the state of the signal Si or S2 and interrupts the CPU 101, the CPU 101 can recognize on which of the upper and lower surface sides of the main body 1 the lid 2 is mounted, or from which of the upper and lower surface sides of the main body 1 the lid 2 is separated.

An A/D inverter 105 and a touch panel control circuit 106 in the main body 1 can exchange signals with the touch panel 21 of the lid 2 through the electrodes T1 to T4, and T5 to T8. When a part of the touch panel 21 is pointed with the user's finger or the input pen, the touch panel control circuit 106 detects a change in signal caused by this pointing operation, and supplies an interrupt to the CPU 101. In response to the interrupt from the touch panel control circuit 106, the CPU 101 receives a digital signal obtained by A/D-converting an analog voltage signal from the touch panel 21 with the A/D inverter 105, and determines the coordinates of the pointed position.

Figure 7:
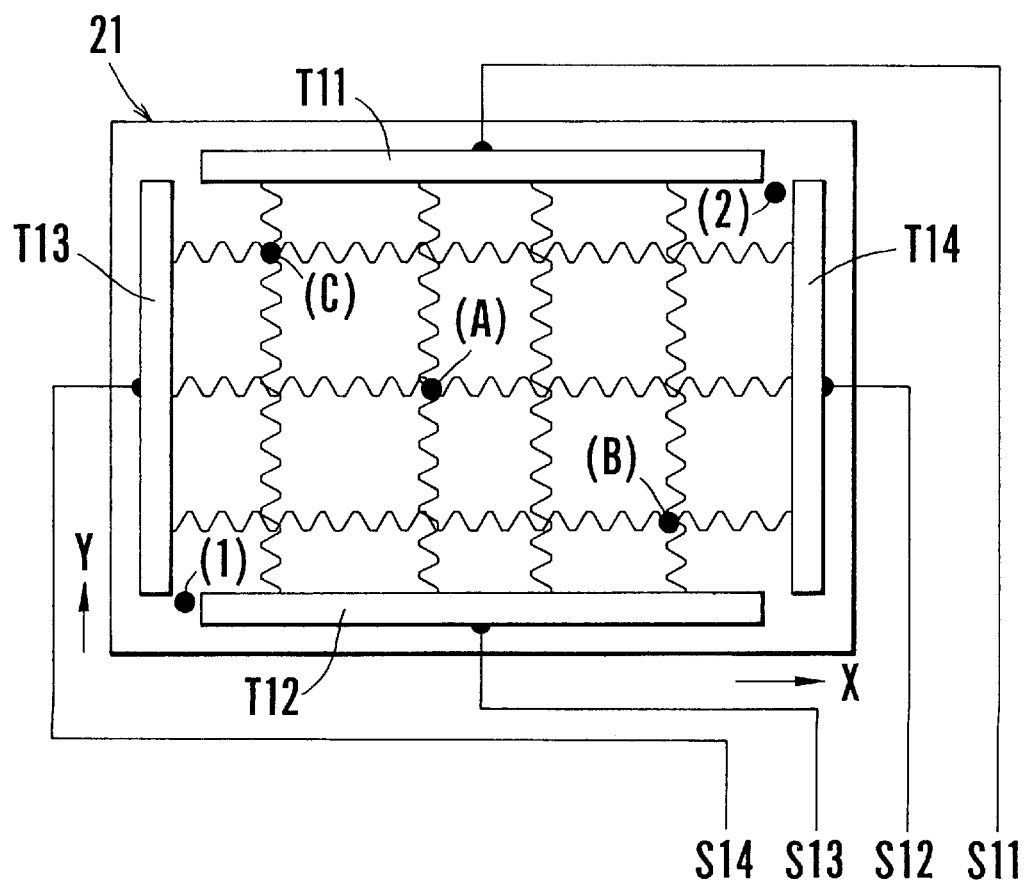
FIG. 7 is a schematic diagram showing the arrangement of a touch panel used in the portable terminal apparatus according to the present invention.

The touch panel 21 has the basic arrangement shown in FIG. 7. Resistors in the X direction (the horizontal direction in FIG. 7) connect electrodes T13 and T14 to each other, while resistors in the Y direction (the vertical direction in FIG. 7) connect electrodes T11 and T12 to each other. Usually, the resistors in the X direction and the resistors in the Y directions are spatially vertically separated from each other and are not in contact with each other, but come into contact with each other through a pointed point. For example, under the control of the CPU 101, assume that the touch panel control circuit 106 applies 3 V to signals S12 and S14 through the electrodes T1 to T4 and T5 to T8, to pull down a signal (to be referred to as a pointing detection signal hereinafter) in the main body 1 to which a signal S13 is connected (the resistance of the pull-down resistor is sufficiently larger than the resistance of the touch panel 21). When no pointing operation is performed, the pointing detection signal is at the GND level. When a pointing operation is performed, the pointing detection signal changes to nearly 3 V. The touch panel control circuit 106 detects this change in pointing detection signal and supplies an interrupt to the CPU 101. Hence, the CPU 101 can recognize that the touch panel 21 is pointed.

A method of determining a coordinate position of a pointed point on the touch panel 21 will be described. As shown in FIGS. 8A and 8B, the connection relationship between the electrodes of the main body 1 and the electrodes of the lid 2 is reversed depending on on which of the upper and lower surface sides of the main body 1 the lid 2 is mounted. A signal S11 and the signals S12 to S14 are transmitted to the lid 2 in accordance with this connection. Assume that the lid 2 is mounted on the upper surface side of the main body 1. As shown in FIG. 8A, when the X-coordinate of the pointed point is detected, the CPU 101 controls the touch panel control circuit 106 to apply 3 V to the electrode T2 of the main body 1 and to maintain the electrode T4 at the GND level. An analog voltage signal from the electrode T1 or T3 is A/D-converted by the A/D inverter 105 to obtain X-coordinate position data. When the Y-coordinate of the pointed point is detected, the CPU 101 applies 3 V to the electrode T1, sets the electrode T3 to GND level, and A/D-converts an analog voltage signal from the electrode T2 or T4 to obtain Y-coordinate position data. Therefore, it is when point "1" in FIG. 7 is pointed that the smallest position data, both in the X- and Y-coordinates, are obtained. When point "A" is pointed, the X-coordinate analog voltage from the main body electrode T1 and the Y-coordinate analog voltage from the electrode T2 become (X voltage, Y voltage)=(1.2 V, 1.5 V). When point "B" is pointed, (X voltage, Y voltage)=(2.2 V, 0.75 V). When point "C" is pointed, (X voltage, Y voltage)=(0.8 V, 2.25 V).

Assume that the lid 2 is mounted on the lower surface side of the main body 1. As shown in FIG. 8B, regarding the main body electrodes, the values obtained when the X-coordinate is detected while the lid 2 is mounted on the upper surface side of the main body 1 correspond to the values obtained when the Y-coordinate is detected while the lid 2 is mounted on the lower surface side of the main body 1. Similarly, the values obtained when the Y-coordinate is detected while the lid 2 is mounted on the upper surface side of the main body 1 correspond to the values obtained when the X-coordinate is detected while the lid 2 is mounted on the lower surface side of the main body 1. In fine, X-coordinate position detection and Y-coordinate position detection are reversed between front surface-side mounting and lower surface-side mounting. Accordingly, during lower surface-side mounting, point "2" in FIG. 7 is the reference point. When point "A" is pointed, the X-coordinate analog voltage from the main body electrode T2 and the Y-coordinate analog voltage from the electrode T1 become (X voltage, Y voltage)=(1.8 V, 1.5 V). When point "B" is pointed, (X voltage, Y voltage)=(0.8 V, 2.25 V). When point "C" is pointed, (X voltage, Y voltage)=(2.2 V, 0.75 V).

As described above, the CPU 101 can determine whether the lid 2 is mounted on the upper or lower surface side of the main body 1, or is separated from the upper or lower surface side of the main body 1. When the lid 2 is mounted, the CPU 101 can detect that a touch panel 21 is pointed, and can determine the coordinate position of the pointed point. Accordingly, when the lid 2 is mounted on the upper surface side of the main body 1, the CPU 101 controls the LCD driver 107 to turn on a dot of the LCD 10 corresponding to the pointed point, thereby enabling input of a handwritten character or illustration. When the CPU 101 further controls the LCD driver 107 to display menu items on the LCD 10, the selected item can be determined from the pointed point. Thus, the user can perform selection among various types of menu items by using his finger or an input pen.

When the lid 2 is mounted on the lower surface side of the main body 1, the CPU 101 determines, from the pointed point, which one of the print keys 12 adhered to the lower surface of the main body 1 is entered, and controls the LCD driver 107 accordingly to display a corresponding character or the like on the LCD 10. Thus, the user can input sentences or the like by using his finger or an input pen. In this case, if the LCD 10 directed downward is rotated through about 180° with the hinge mechanisms 11, as shown in FIG. 4B, the user can input a character or the like while confirming the input content by observing the displayed contents of the LCD 10.

When the lid 2 is not mounted on the main body 1, the CPU 101 stops the operation of the A/D inverter 105 or touch panel control circuit 106 or stops power supply from an operation power supply to decrease power consumption.

As another arrangement of the print keys formed on the lower surface side of the main body 1, as shown in FIG. 9, a slot 16 where a key card 15 printed with letters, numerals, and the like is to be mounted may be formed in the lower surface of the main body 1, and a key card having a different key arrangement may be mounted in the slot 16 by exchange. In this case, key input systems corresponding to the types of key cards 15 that can be mounted must be stored in the internal storage circuit. When a key input system corresponding to the mounted key card is selected, various types of key input operations can be performed. For example, in the example shown in FIGS. 10A and 10B, as key cards, (1) the "hiragana character+numeral" key card, (2) the "katakana character+numeral" key card, (3) the "letter+numeral" key card, (4) the "symbol+numeral" key card, and (5) the "function calculator" key card can be used by exchange. When one of these key cards is mounted on the main body, the main body should automatically recognize the key card. Concerning automatic key card recognition, the widely known techniques, e.g., optical or magnetic recognition, can be employed.

In the case of FIG. 10A, the key card of item (1) is mounted in the slot 16. The main body automatically recognizes the type of the mounted key card. "Hiragana character+numeral" is thus selected, and the item corresponding to this is displayed in reverse indication. In the case of FIG. 10B, the key card of (3) "alphabet letter+ numeral" is mounted. The main body automatically recognizes this key card, and the item corresponding to this is displayed in reverse indication. In fine, in any case, when the user of the portable terminal apparatus confirms this reverse indication and selects a confirmation button 17, the reverse-indicated card type is set. Upon this setting operation, when the user performs key input on the touch panel by utilizing a print key, the main body executes key input corresponding to the print key. As a result, many types of characters and symbols can be input, or a function calculation is enabled.

Figure 11:
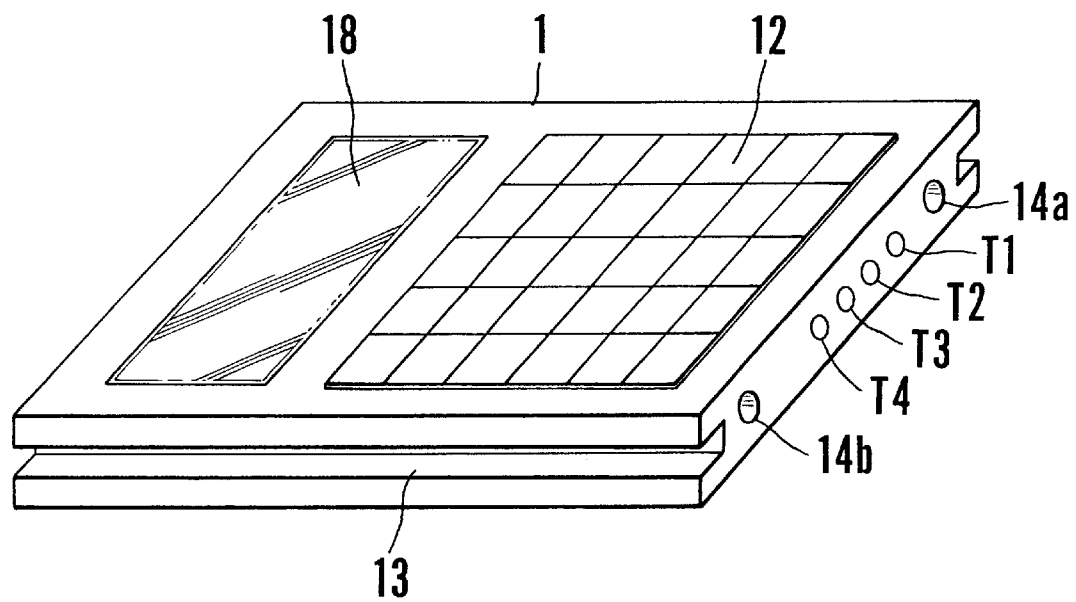
FIG. 11 is a perspective view of another modification of the main body of the portable terminal apparatus according to the present invention which is seen from the lower surface side.
Figure 12:
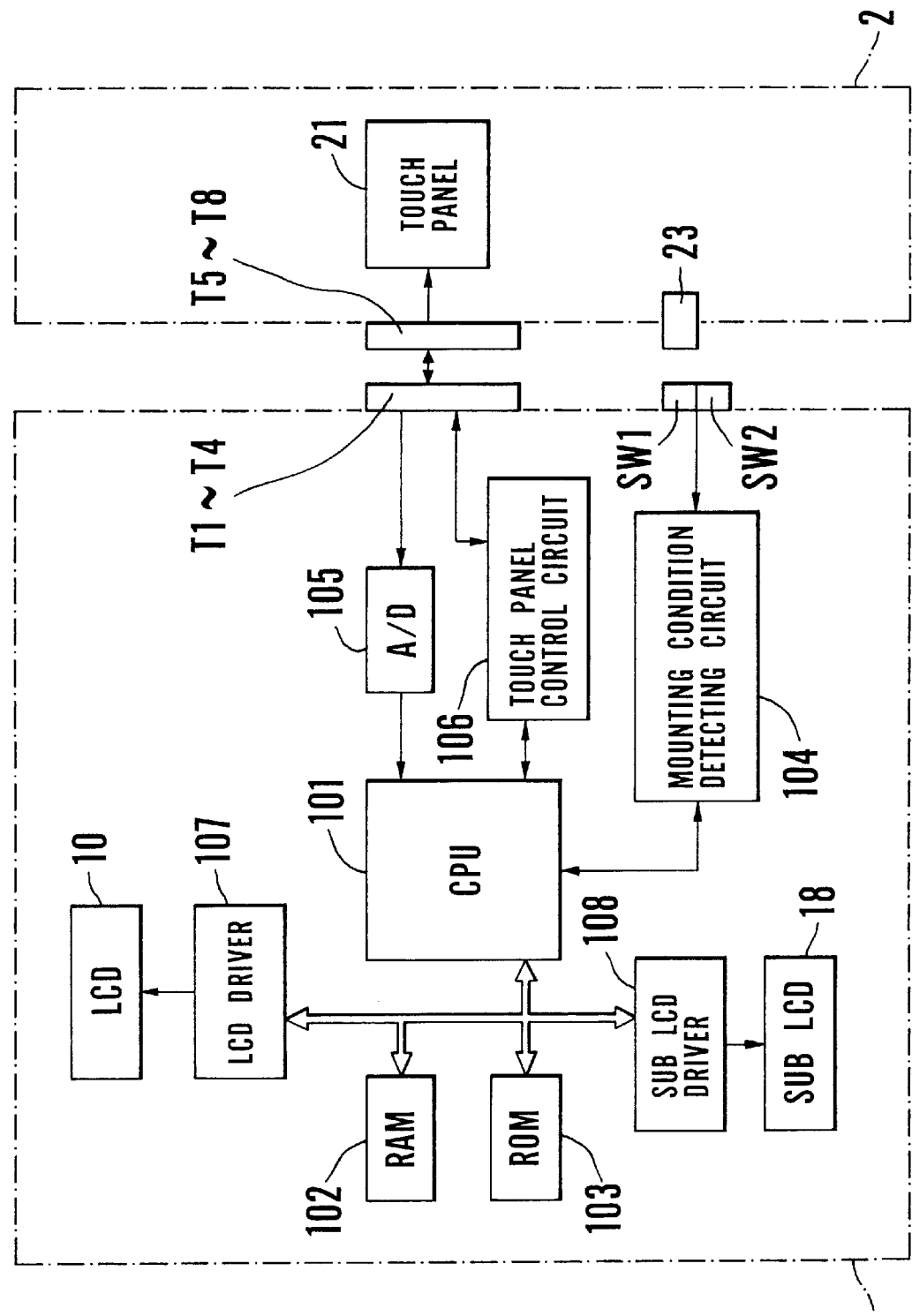
FIG. 12 is a block diagram showing the arrangements of the internal circuits of the main body and the lid of the modification shown in FIG. 11.

In the present invention, as shown in FIG. 11 showing the lower surface side of the main body 1, a sub-LCD 18 for confirming the latest input content may be arranged at a position adjacent to the print keys 12. FIG. 12 is a block diagram of the internal arrangement of a main body 1 including the sub-LCD 18. In FIG. 12, portions that are equivalent to those of the arrangement shown in FIG. 5 are denoted by the same reference numerals as in FIG. 5, and a detailed description thereof will be omitted. Assume that a touch panel 21 is mounted on the lower surface side of the main body 1, and a character or the like is to be input by utilizing the print keys 12. The latest input characters up to a predetermined number of input data are displayed on the sub LCD 18 by controlling a sub LCD driver 108 with a CPU 101. Characters that have been input before this predetermined number, or all the input characters including this predetermined number are displayed on an LCD 10 by controlling an LCD driver 107. Therefore, the user can perform a key input operation of a character or the like while confirming the latest input content on only the lower surface side of the main body 1.

With this arrangement, when inputting a short sentence or sentences, key input can be executed without confirming the upper surface-side LCD 10 but by observing only the sub LCD 18. Therefore, the LCD 10 on the upper surface side need not be pivoted by utilizing the hinge mechanisms 11, and a key input operation can be performed more easily. The contents of the entire input file can be confirmed on the LCD 10 on the upper surface side, as a matter of course.

Figure 13:
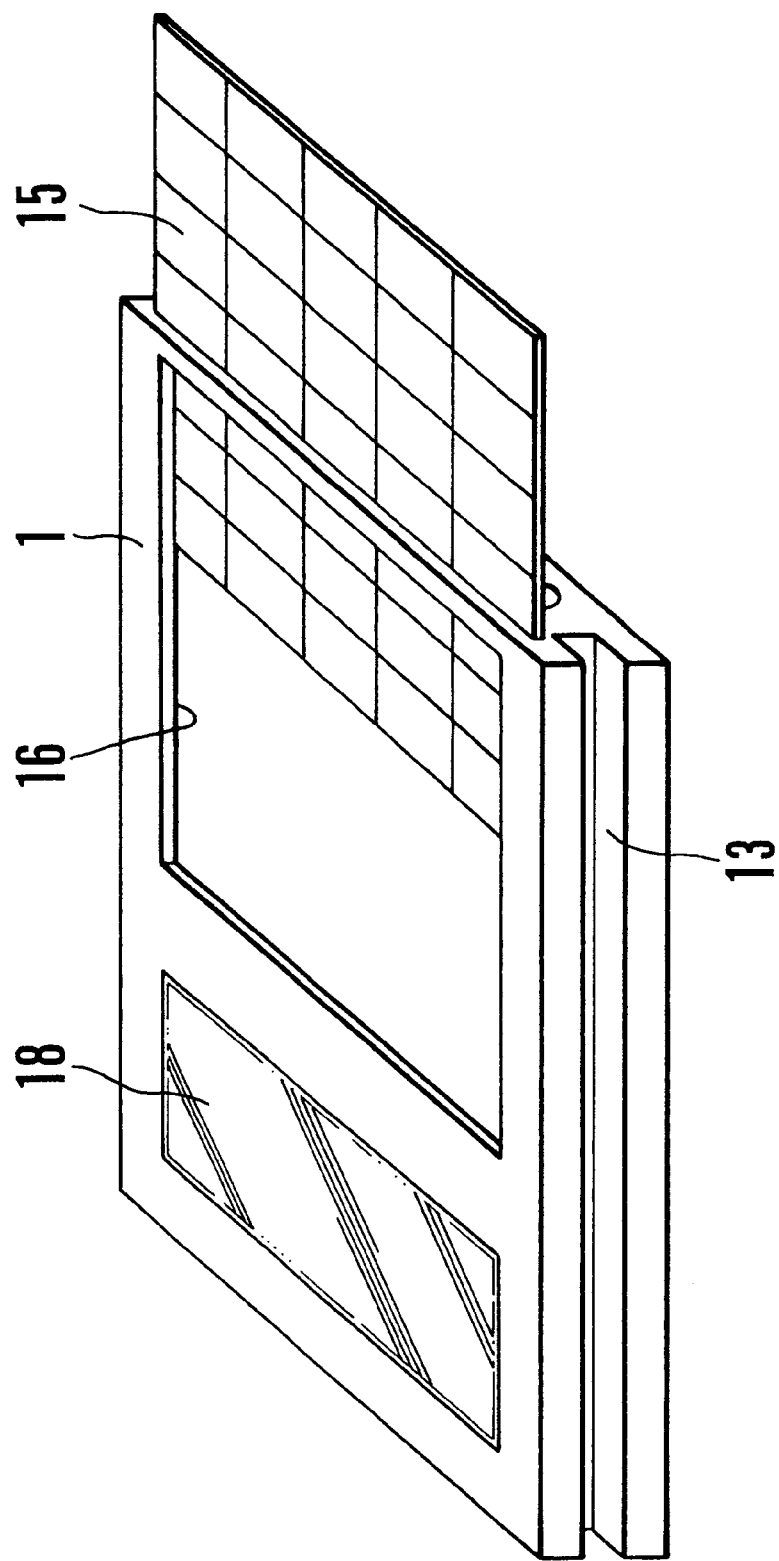
FIG. 13 is a perspective view of still another modification of the main body of the portable terminal apparatus according to the present invention which is seen from the lower surface side.

In this embodiment as well, as shown in FIG. 13, as the print keys, a different key card may be mounted by exchange by utilizing a slot 16 formed in the lower surface side of the main body 1.

What is claimed is:

1. A portable terminal apparatus comprising a main body with display means capable of displaying a character or other patterns on an upper surface side thereof and a key display on a lower surface side thereof, and a lid which can be mounted on and detached from said main body and which has a transparent touch panel arranged at a position to cover either one of said display means and said key display when said lid is mounted on said main body, said main body having means for recognizing the mounting condition of said lid whether said touch panel is mounted on the upper surface side or the lower surface side of said main body, means for determining a position pointed on said touch panel, means for controlling display of a character or a pattern displayed on said display means, and central processing means for controlling said display control means on the basis of outputs from said recognizing means and said determining means and for causing said display means to display the character or other pattern.

2. An apparatus according to claim 1, wherein when said lid is mounted on said upper surface side of said main body and said display control means displays a software keyboard on a partial region of said display means, said central processing means performs a control operation for displaying input data, corresponding to a key located at a position which is pointed on said touch panel, on another region of said display means.

3. An apparatus according to claim 1, wherein when said lid is mounted on said upper surface side of said main body and said display control means does not display a software keyboard on said display means, said central processing means continuously determines positions pointed on said touch panel and displays the determined positions as handwritten input data on said display means.

4. An apparatus according to claim 1, wherein when said lid is mounted on said lower surface side of said main body, said central processing means performs a control operation for displaying input data, corresponding to said key display at a position which is pointed on said touch panel, on said display means.

5. An apparatus according to claim 4, wherein said key display can be mounted by exchanging a plurality of key cards having different key arrangements, and said central processing means has a function of recognizing a mounted key card and displaying input data on the basis of said recognized key card.

6. An apparatus according to claim 4, wherein said main body has auxiliary display means, beside said key display, on a lower surface thereof, and a control operation is performed such that latest input data, corresponding to said key display at a position pointed on said touch panel, is displayed on said auxiliary display means.

7. An apparatus according to claim 1, wherein said display means on said upper surface side of said main body is swingingly mounted on said main body through a hinge mechanism.

\* \* \* \* \*